United States Patent Office 3,806,452
Patented Apr. 23, 1974

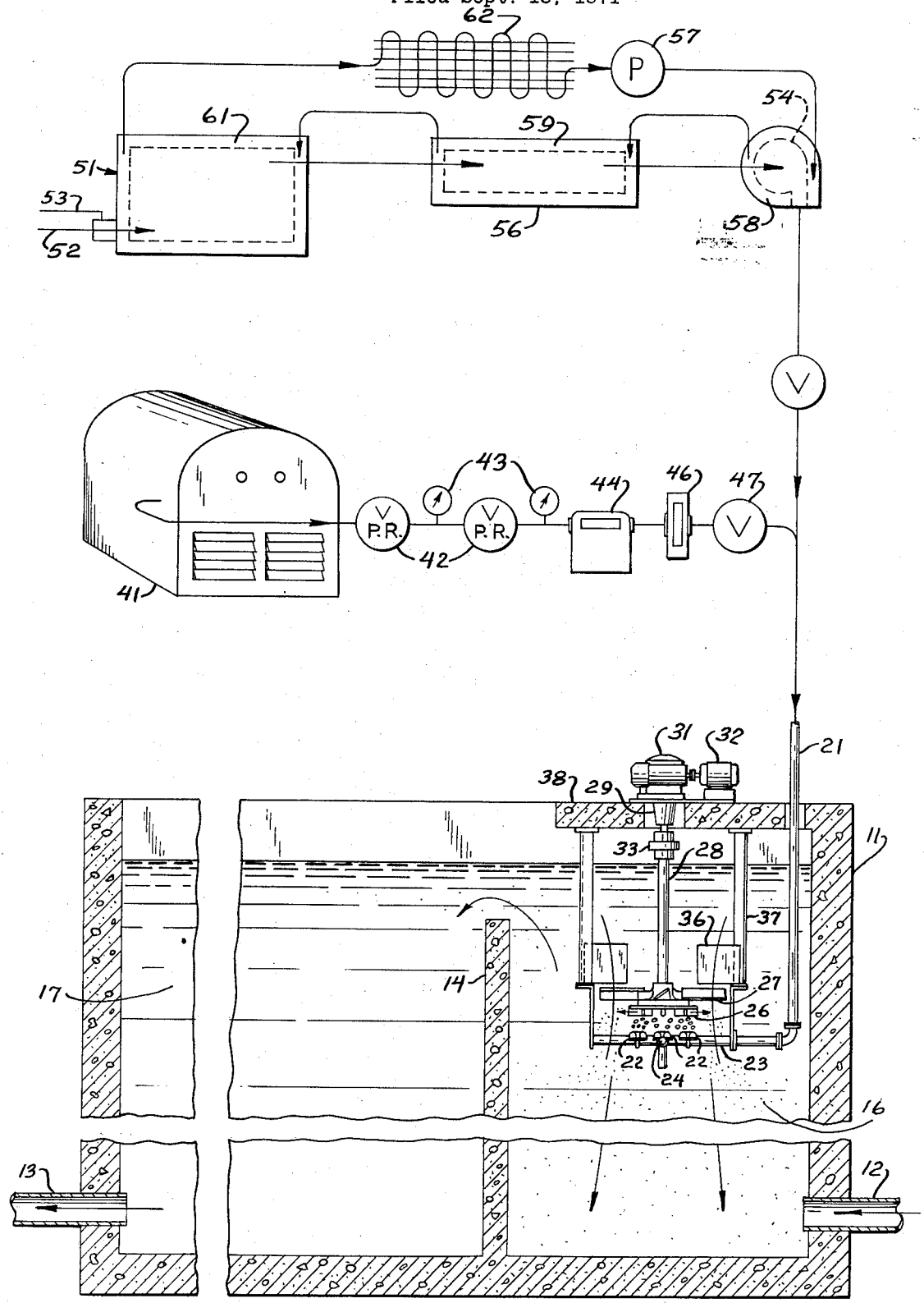

3,806,452
DISSOLVING LOW PRESSURE GAS
EFFICIENTLY
James Donald Walker, Aurora, Ill., assignor to
Chicago Bridge & Iron Company, Aurora, Ill.
Filed Sept. 13, 1971, Ser. No. 176,405
Int. Cl. C02c 3/06
U.S. Cl. 210—59                                    5 Claims

ABSTRACT OF THE DISCLOSURE

Gas including carbon dioxide is liberated through coarse bubble liberators beneath a compound turbine located at a relatively shallow depth in a tank. The gas passes first into a radially acting or centrifugal impeller which breaks up the bubbles and throws the resulting stream outwardly into the path of a downwardly moving stream from an axially acting impeller. The turbulence resulting between the two streams breaks up the bubbles further, and the downwardly moving stream carries the finely divided bubbles throughout the tank or the appropriate tank section. The source may be a bottled or cyrogenic supply of substantially pure carbon dioxide (or other gas to be dissolved). The source may be a gas burner nominally at atmospheric pressure from which the products of combustion flow through a cooler reducing their temperature to, for example, 900° F., and then through a centrifugal blower providing enough pressure for the shallow submergence. Preferably the burner, cooler and blower are counterflow water-cooled.

INTRODUCTION

The invention, of which this disclosure is offered for public dissemination in the event patent protection is available, relates to the efficient dissolving of gases at low pressure, and particularly to carbonation of a water supply to remove alkalinity such as results from the lime method of water softening. Nearly all large scale water softening results in water that is slightly alkaline and needs to be neutralized. The usual and most efficient method of neutralizing is to dissolve $CO_2$.

Heretofore the gas containing $CO_2$ has usually been liberated deep in the tank, in a manner to produce fine bubbles (as liberated or after turbulent break-up) with dissolution achieved during the relatively slow rise of the fine bubbles through the liquid. In some instances the gas-lift action of the bubbles was used to stir the contents of the tank.

It is of course well understood that fine bubbles provide much greater efficiency of dissolution than coarse bubbles. A given total quantity of gas will have many times the amount of surface or interface in the form of fine bubbles. Also the fine bubbles rise more slowly relative to the movement of the water.

Obtaining efficiency of dissolution by deep liberation of the gas tends to require that if $CO_2$ is produced by burning, the burning be under a pressure somewhat greater than the hydrostatic pressure at the depth of liberation. Such pressurized burning has been commonly practiced. However, objections to it have long been recognized. The most serious objection is fear that if a leak permits escape of the gas anywhere in the system, a slight content of carbon monoxide which would otherwise be tolerable may become intolerable or even fatal.

There have been attempts to achieve tolerably efficient dissolution of gas liberated at shallow depth, and some have been successful in some respects. However, those which achieved better dissolving or absorption efficiencies have tended either to require relatively expensive equipment costs or to be relatively wasteful of power.

According to the present invention dissolving efficiency with shallow level liberation is achieved with economy both as to equipment costs and power usage. A single shaft turns a compound impeller, the inner portion (which the gas enters first) being a centrifugal turbine which produces an outward flow of water and bubbles already of reduced size. This outwardly flowing stream flows into the path of a downwardly flowing annular stream from axially acting blades. Turbulence resulting from the interaction of the two streams breaks up the bubbles into fine bubbles, and the downwardly moving stream carries the bubbles into the tank depths near the floor. Of course, any bubbles not dissolved tend to rise, with somewhat the same rise time as if they had been initially liberated deep in the tank, so that their total exposure for dissolution may be considerably greater.

Efficient dissolution by shallow liberation lends itself to avoiding the pressurized burning of the fuel to produce the $CO_2$. According to one aspect of the present invention, the gas is burned without pressurizing the combustion chamber and the products of combustion are then cooled sufficiently so that pumping with an inexpensive blower is practicable, and a centrifugal blower is used for giving quite economically the relatively low pressure needed for shallow submergence liberation. Preferably a coolant is used, the cool coolant flowing first through the jacket (i.e. the jacket passage) of the pump, then through the jacket or coolant passage of the gas cooler and finally through the jacket of the burner from which it flows through a coolant heat-dissipater for return to the cycle.

The efficient dissolution by the compound impeller also lends itself to the use of relatively pure $CO_2$, either regularly or in emergencies. Supply from tanks, such as cryogenic systems, is practicable because of the thoroughness of the dissolution of the $CO_2$ at low power cost.

Additional objects and advantages of the invention will be apparent from the following description and from the drawing.

THE DRAWING

The drawing is a figure indicating diagrammatically a choice between two sources of supply for carbon dioxide or gas containing carbon dioxide, and showing a vertical sectional view of a tank incorporating a preferred form of low pressure gas dissolving apparatus.

INTENT CLAUSE

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

BACKGROUND DESCRIPTION

A carbonation tank 11 is provided with inflow 12 and outflow 13. According to opetional prior practice it may have a partial partition 14 dividing the tank into an absorption or dissolution section 16 and a reaction or holding section 17. Water which needs to be carbonated, typically water softened by industrial processes, flows into absorption section 16, and after being carbonated therein by liberation of carbon dioxide bubbles flows over partition 14 and eventually, when fully reacted, out through outflow 13 to distribution or use.

EFFICIENT LOW PRESSURE GAS DISSOLUTION

One aspect of the invention is concerned with the efficient dissolution of gas supplied through supply pipe 21, preferably at a pressure too low for release of the gas deep in the tank. According to this aspect of the invention, the gas is released through spargers 22 mounted on one or more headers 23, or pherhaps a main header 23 and a cross header 24. The spargers may conveniently be similar to those of Walker Pat. 3,153,682, although plastic spargers integral with a securing saddle are preferred. Perforated pipes could be used instead of spargers.

Some means of coarse bubble liberation such as spargers or perforated pipe is preferred to avoid clogging problems and the need for higher pressure in the supply of gas. Higher pressure would of course increase pumping costs.

The spargers 22 are located a few inches below the centrifugal portion 26 of a compound centrifugal-axial impeller or turbine, which also includes the axially acting blades 27. The compound impeller 26, 27 is carried by a shaft 28 guided about a constant axis by a bearing 29 of gear box 31 and driven by electric motor 32. If a coupling 33 is provided for shaft 28, it is a rigid coupling so that the shaft 28, rotating at only moderate speed, and of moderate length such as 8 feet, needs no bottom guidance. The bearing 29 gives bearing support at areas substantially spaced from one another axially.

The centrifugal impeller 26 consists essentially of axially acting vertically disposed blades which are preferably exposed along their bottom edges for entrance of the liquid and gas along these edges as well as at the eye between the blades. The blades are carried on the underside of a plate, which excludes inflow except at the eye and the bottom. The centrifugal action produces a suction at the eye, however, which tends to draw the adjacent liquid with its coarse bubbles predominantly to that area, the buoyancy of the bubbles aiding the upward movement. The numerous blades of impeller 26, and especially the edges of the blades along the entry region tend to chop the bubbles into smaller sizes.

The axial flow impeller 27 may comprise four axial flow impeller blades which create a strong annular stream flowing downwardly past the periphery of centrifugal impeller or turbine 26. The stream ejected centrifugally from impeller 26 thus flows into the downwardly flowing annular stream from impeller 27. The interaction produces vigorous turbulence which breaks up the bubbles into the fine bubbles required for efficiency of dissolution, absorption, or transfer. The downward stream from impeller 27 carries the fine bubbles into the depths of the tank.

Of course there must be an even greater upward flow than there is downward flow, since all the water pumped downwardly must, if partial partition 14 is provided, flow upwardly, and so must the inflowing water from inflow 12. The speed of upward flow will depend largely upon the horizontal cross section of the absorption or carbonation section 16 which may be considerably larger than illustrated, as compared to the size of the equipment described.

So that the impellers 26, 27 will not cause an objectionable rotation of the entire contents of absorption section 16, straightening vanes 36 are preferably provided. The straightening vanes may be carried by rods 37 extending down from the bridge 38 which supports gear box 31 and motor 32. These rods may also support header 23, and a shroud surrounding impellers 26, 27 if such a shroud is desired.

SUPPLY OF BOTTLED CO₂

The gas supplied to supply pipe 21 may be pure or relatively pure $CO_2$, which in most instances would be supplied as bottled gas or from a cryogenic system represented at 41. This connotes the supply of liquefied gas kept at low temperature. The gas from any such source of supply would pass through one or two pressure regulators 42, the pressure at each stage indicated by gauge 43. It might also pass through a gas meter 44 and a flow meter 46 as well as a shut-off value 47.

BURNER-SUPPLIED CO₂

The source of supply 41 could be merely a reserve supply in the form of high pressure cylinders or tanks used only in emergency. In that event, the $CO_2$ would be locally produced. A greatly preferred method of producing the $CO_2$ by local burning of a suitable fuel is shown at the top of the figure. A $CO_2$ producer or burner 51 is supplied with fuel (gas or oil) through a fuel line 52. Of course, air is also provided as through an air line 53, through which air may be blow by a low pressure blower for supplying both primary and secondary air.

According to this aspect of the present invention the burner 51 will operate at nominally atmospheric pressure, possibly slightly lower than atmospheric pressure due to suction from blower 54.

To protect the blower and subsequent portions of the equipment from damage by hot gases, and thereby permitting the use of an inexpensive blower, the gas is cooled between the burner 51 and blower 54 to substantially reduce is temperature, and cooler 56 is provided for this purpose. A temperature reduction to about 900°- F. is believed to be sufficient. A liquid cooled heat exchanger is most efficient for the cooler 56. Preferably the coolant is pumped by a pump 57 through the continuous circuit shown, countercurrent to the flow of hot gases. Thus from the pump 57 it may flow through the jacket 59 or coolant passages of cooler 56 and through the jacket 61 of burner 51, in that order, then through a heat dissipater 62 back to pump 57. The heat dissipater 62 can be provided with air or water cooling.

With this arrangement the various problems of pressurized burning for production of $CO_2$ at a pressure suitable for liberation deep in a tank is avoided. The blower 54 can be a very efficient centrifugal blower since it only needs to compress the gas sufficiently for a release at a shallow depth such as six feet. The depth should be great enough to be sure that axial flow impeller 27 will not cause cavitation or vortexing from the surface.

ACHIEVEMENT

According to the present invention very efficient absorption of low pressure gas is achieved with relatively low initial equipment expense. Although carbonation has been discussed primarily, this aspect of the invention can be used for dissolving other gases, such as oxygen.

According to another aspect of the invention, a very efficient carbonation system is provided in which the $CO_2$ is produced in a relatively safe and trouble-free manner from a boiler operating nominally at atmospheric pressure, the gas being cooled to a temperature such that it can be compressed efficiently by a relatively inexpensive blower of only moderate heat resistance. The use of such a blower is made highly practicable by the efficient absorption of gas when released in coarse bubbles at shallow submergence.

I claim:
1. Apparatus for efficiently dissolving gas in a liquid including combination impeller means, means for rotating the impeller means at shallow submergence about a substantially vertical axis; said impeller means including a centrifugally acting portion with a multiplicity of blades of generally vertical disposition and having edges exposed along an entry region and axially acting blades reaching to a greater radius than the centrifugally acting portion to provide a stream of water flowing downwardly circumjacent the centrifugally acting portion and which is entered by the discharge from the latter; and means separated from the impeller for liberating coarse bubbles of the gas to be dissolved in the liquid flowing to the centrifugally acting portion to be broken up successively by the centrifugally acting portion, in part by shearing action by the blades upon entry into the centrifugally acting portion and by turbulence resulting from the interaction of the centrifugal flow and downward stream and to be then carried downwardly by the stream from the axially acting blades to the depths of the tank.

2. The method of efficiently dissolving gas which comprises liberating the gas in the form of coarse bubbles from a stationary member and in a position to be drawn into a centrifugally acting turbine having a multiplicity of generally vertical blades which shear the bubbles as they enter the turbine, and providing a downwardly moving annular stream circumjacent the turbine which intercepts flow from the turbine to produce turbulence and interaction with the centrifugal flow from the turbine for breaking up the bubbles into fine bubbles, and carrying the fine bubbles to the depths of the tank in the downwardly moving stream.

3. The method of efficiently dissolving gas which comprises liberating the gas in the form of coarse bubbles from a stationary member and in a position to be drawn into a centrifugally acting turbine having a multiplicity of generally vertical blades which shear the bubbles as they enter the turbine, and rotating axial flow blades jointly with the turbine to provide a downwardly moving annular stream circumjacent the turbine which intercepts flow from the turbine to produce turbulence and interaction with the centrifugal flow from the turbine for breaking up the bubbles into fine bubbles, and carrying the fine bubbles to the depths of the tank in the downwardly moving stream.

4. The method of neutralizing water by dissolving carbon dioxide therein which comprises burning a suitable fuel in a combustion chamber under pressure conditions substantially as low as atmospheric, cooling the resulting products of combustion, compressing the cooled products of combustion with a centrifugal blower, liberating the compressed products of combustion as coarse bubbles at a shallow depth of submergence in water passing through a retention tank, rotating combination impeller means about a vertical axis, with a smaller diameter portion of the impeller means forming a centrifugal turbine positioned to draw in the bubbles and having a multiplicity of generally vertical blades to shear the bubbles as they enter the turbine and to eject centrifugally a stream with bubbles of reduced size into a downwardly moving annular stream produced by the larger diameter portion of the combination impeller means and which intercepts said stream to produce turbulence whereby the bubbles are further reduced in size and then carried to the depths of the tank.

5. Apparatus for carbonation of a water supply including a retention tank through which the water supply passes, a burner producing products of combustion including carbon dioxide at substantially as low as atmospheric pressure, means for significantly cooling the products of combustion, a centrifugal blower for compressing the cooled products of combustion for discharging them at moderately shallow submergence in the tank, combination impeller means, means for rotating the impeller means at shallow submergence in the tank about a substantially vertical axis; said impeller means including a centrifugally acting portion of numerous blades generally of vertical disposition and with edges exposed at an entry region, and axially acting blades reaching to a greater radius than the centrifugally acting portion to provide a stream of water flowing downwardly circumjacent the centrifugally acting portion; and means for liberating coarse bubbles of the compressed products of combustion in the liquid flowing to the centrifugally acting portion to be broken up successively by the blades of the centrifugally acting portion and by turbulence resulting from the interceptive interaction of the centrifugal flow and downward stream and to be then carried downwardly by the stream from the axially acting blades to the depths of the tank.

References Cited
UNITED STATES PATENTS

| 2,964,382 | 12/1960 | Hall | 261—93 X |
|---|---|---|---|
| 3,412,741 | 11/1968 | Mills | 210—59 X |
| 2,928,661 | 3/1960 | MacLaren | 261—87 X |
| 2,308,751 | 1/1943 | Guthrie et al. | 261—87 X |
| 3,559,964 | 2/1971 | Sell et al. | 261—91 |

JOHN ADEE, Primary Examiner

R. H. SPITZEN, Assistant Examiner

U.S. Cl. X.R.
210—219; 261—93